B. J. BUCKINGHAM.
EXTENSION GARMENT RACK.
APPLICATION FILED JUNE 1, 1908.
943,137.
Patented Dec. 14, 1909.
2 SHEETS—SHEET 1.
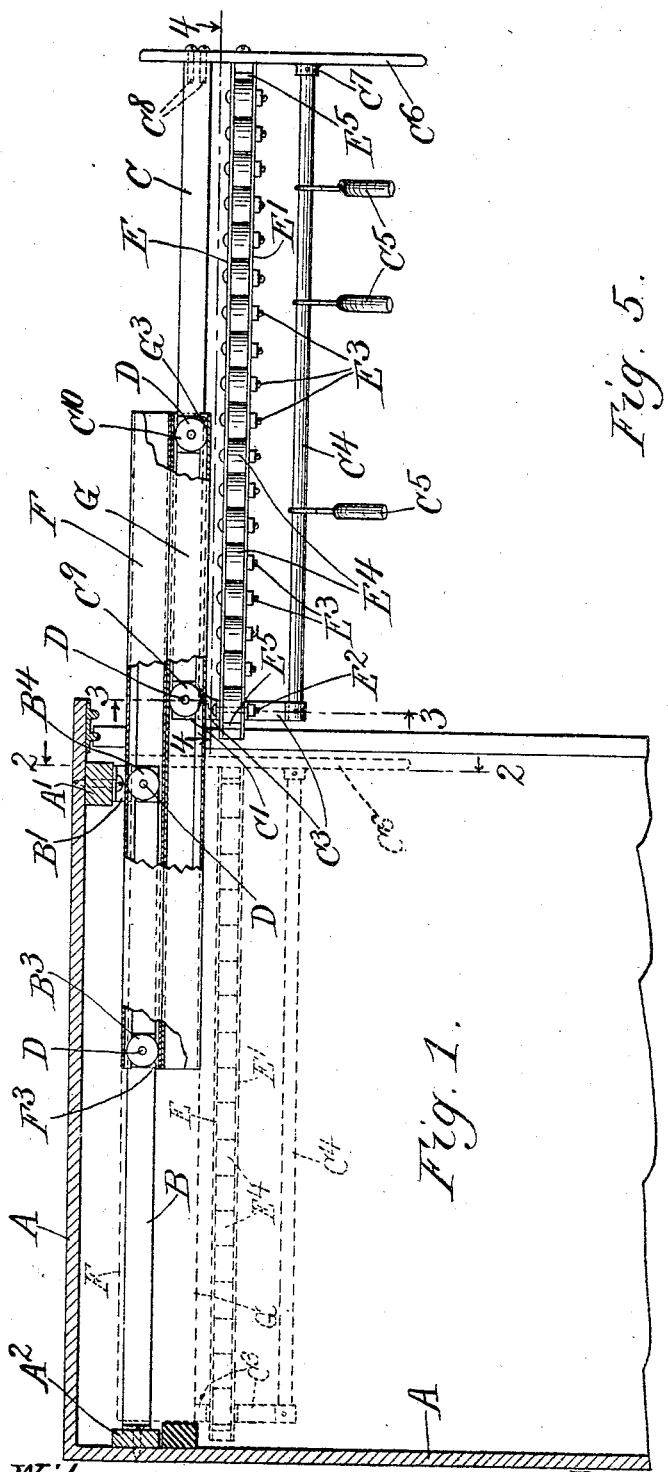
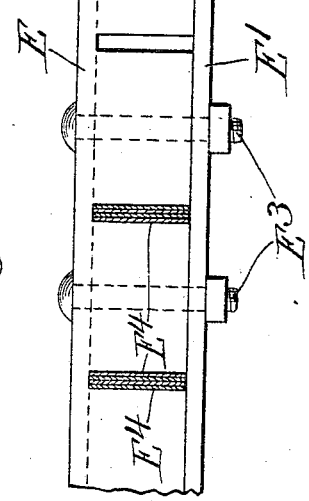
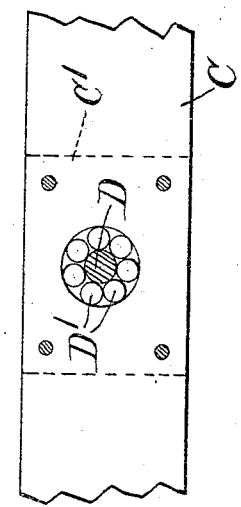
Witnesses.
Edward T. Wray.
Lucy A. Falkenburg.
Inventor.
Benjamin J. Buckingham,
by Parker Cortes
Attorneys.

B. J. BUCKINGHAM.
EXTENSION GARMENT RACK.
APPLICATION FILED JUNE 1, 1908.
943,137.
Patented Dec. 14, 1909.
2 SHEETS—SHEET 2.
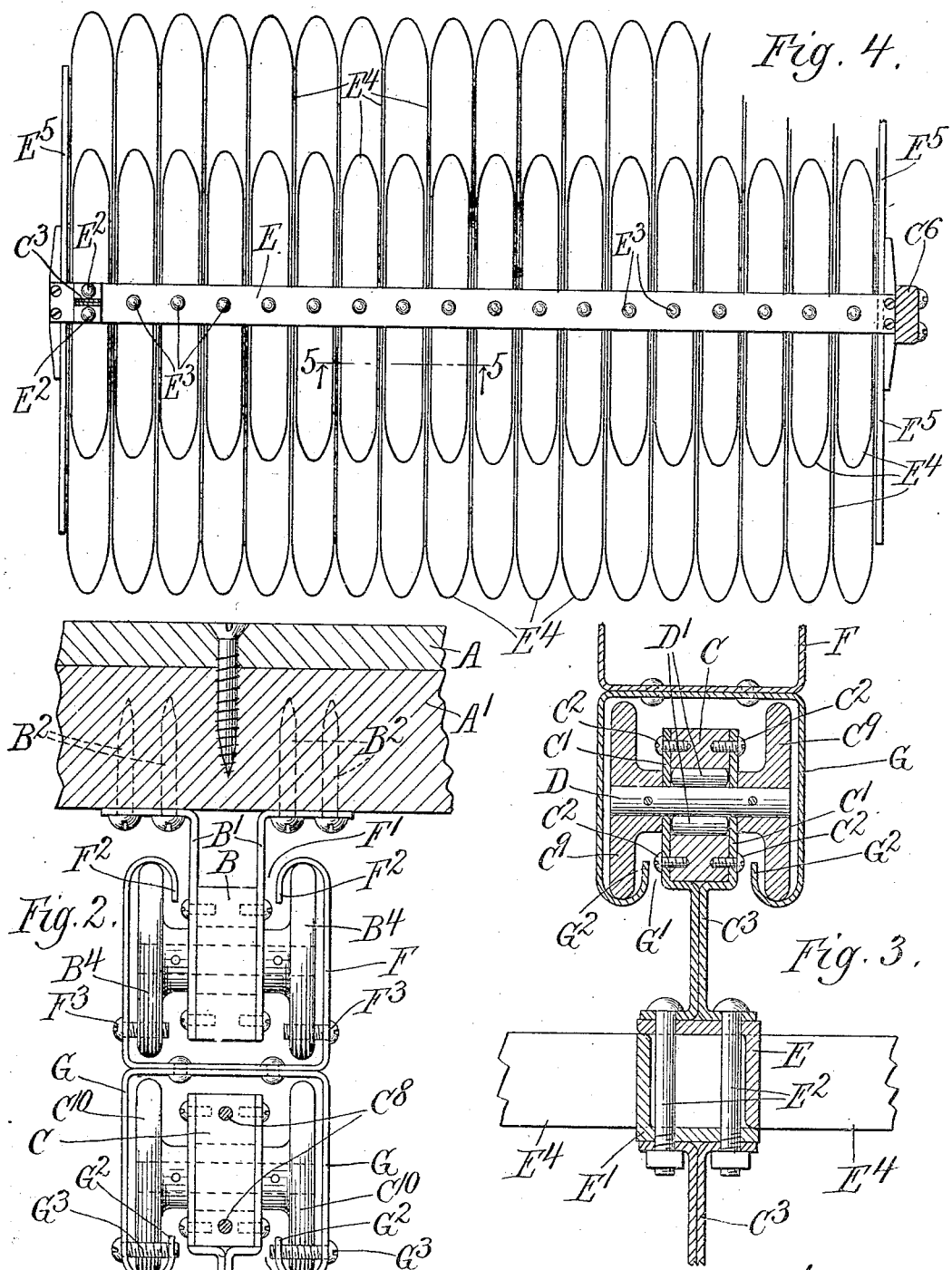
Witnesses
Edward T. Wray.
Lucy A. Falkenburg.
Inventor
Benjamin J. Buckingham,
by Parker & Carter
Attorneys.

UNITED STATES PATENT OFFICE.

BENJAMIN J. BUCKINGHAM, OF CHICAGO, ILLINOIS, ASSIGNOR TO BUCKINGHAM-RAE COMPANY, OF CHICAGO, ILLINOIS, A CORPORATION OF ILLINOIS.

EXTENSION GARMENT-RACK.

943,137.  Specification of Letters Patent.  Patented Dec. 14, 1909.

Application filed June 1, 1908. Serial No. 435,946.

*To all whom it may concern:*

Be it known that I, BENJAMIN J. BUCKINGHAM, a citizen of the United States, residing at Chicago, in the county of Cook and State of Illinois, have invented a certain new and useful Improvement in Extension Garment-Racks, of which the following is a specification.

My invention relates to extensible racks for garment holders.

It is illustrated in the accompanying drawings, wherein—

Figure 1 is a side elevation with parts broken away; Fig. 2, a detail on the line 2—2 of Fig. 1 with all the parts moved back into the cabinet; Fig. 3, a detail on the line 3—3 of Fig. 1; Fig. 4, a plan view on the line 4—4 of Fig. 1; Fig. 5, a detail cross section on the line 5—5 of Fig. 4, and Fig. 6, a detail cross section showing one of the rollers D provided with roller bearings about it.

The parts in taking the several sectional views may be supposed to have been moved to bring them into proper position.

Like parts are indicated by the same letter in all the figures.

A A are the walls and top of a case or cabinet in which my extensible rack is intended to be mounted.

$A^1$ is a cross bar on the top thereof and $A^2$ a similar cross bar on the back.

B is a fixed bar secured to the cross bar $A^1$ by means of any suitable socket or supporting plate and spikes or screws. It is also secured at its forward end to the bar $A^1$ by the two plates $B^1$ $B^1$ each of which is secured by the screws $B^2$ $B^2$ to such cross bar $A^1$.

$B^3$ $B^3$ are rollers pivotally mounted on the sides of the bar B below its center and $B^4$ $B^4$ are similar rollers mounted in like manner on the forward end of the bar but above its center.

C is a movable bar having the side plates $C^1$ $C^1$ secured in position by the screws $C^2$ $C^2$ and brought together at $C^3$ to hold one end of the rod $C^4$ on which the hangers $C^5$ are mounted. The forward end of this rod is held by a face plate $C^6$ which is provided with a socket $C^7$ for the rod and is secured at its upper end by the screws $C^8$ to the movable bar C. The movable bar is provided with rollers $C^9$ pivoted on the sides thereof above the center of the bar and with the rollers $C^{10}$ pivoted on the sides thereof below the center of the bar C. The rollers in each case may take the form of wheels mounted on the ends of a short shaft D which passes through the bar and this structure may be used in connection with all of the rollers including those used on both the movable and the fixed bar. In this case the shaft D is preferably surrounded by the rollers $D^1$ held in position by the side plates $C^1$.

The downwardly depending plates $C^3$ $C^3$ may be shaped or severed as indicated in Fig. 3 to receive between them two L-shaped bars E, $E^1$ which are held together at intervals along their length by suitable bolts $E^2$ $E^2$ and $E^3$ and which hold between their ends the several loop spring garment holding fingers $E^4$ $E^4$. These fingers are supported at the two ends of each complete set by the cross bars $E^5$ $E^5$ also mounted on the L-shaped bars.

Intermediate the two bars and adapted to slide or move on the upper or fixed bar and to permit the lower or movable bar to slide on it is a carriage which consists, as illustrated, of the upper portion F open at $F^1$ and bent up along the edges of such opening at $F^2$ so as to form run-ways on both sides of the fixed bar to receive its roller wheels. Stop pins $F^3$ are inserted at the rear end of this portion of the carriage to prevent it from moving beyond the wheels. The lower part of the carriage consists of a similar structure G open at $G^1$ and bent up at $G^2$ to form the run-ways or tracks. Stop pins $G^3$ are inserted at the forward end of the carriage.

It is evident that these parts may be greatly altered without departing from the spirit of my invention and that very material changes in construction, arrangement and location may be made while still retaining the essence of my invention.

The use and operation of my invention are as follows: The structure described consists, as will readily be seen, of three principal elements; a fixed bar, a movable bar and an intermediate carriage which travels on the fixed bar and permits the movable bar to have independent motion. Both bars are inclosed by the carriage, thus making a short, compact and strong structure. The lower bar can be drawn out one-half its length from the carriage and the carriage can be drawn one-half its length outwardly on the fixed bar, thus bringing the parts into the position shown in Fig. 1. I have shown two forms of garment holders supported from the movable bar. Of course either may be used or either dispensed with or both used or any other form of holder could be employed.

I claim:—

1. An extension garment rack comprising two oppositely opening channels with a fixed bar on which the upper is slidably mounted, and a garment holding bar which is slidably mounted on the lower.

2. An extension garment rack comprising a fixed bar, and a movable bar on which the garment holders are mounted, and an intermediate part which incloses both of said bars, the intermediate part movable on the fixed bar, and the movable bar movable on the intermediate part.

3. An extension garment rack comprising a fixed bar and a movable bar on which the garment holders are mounted, and an intermediate part which is open above and below to receive, and which incloses both of said bars, the intermediate part movable on the fixed bar, and the movable bar movable on the intermediate part.

4. An extension garment rack, the combination of a fixed bar with a movable bar, and an intermediate part consisting of an upwardly opening and a downwardly opening portion, the two secured together, the fixed bar projecting down inside the upper part, and the movable bar projecting into the lower part of such intermediate part, and means for connecting them so that the lower bar moves longitudinally on the intermediate part, and the intermediate part on the fixed bar.

5. An extension garment rack comprising a fixed bar with laterally disposed rollers mounted thereon, a movable bar with laterally disposed rollers mounted thereon, and an intermediate part which consists of an upper and lower hollow groove section to receive respectively the upper and lower bars and their rollers.

6. An extension garment rack comprising a fixed bar, a movable bar on which the garment holders are mounted, and an intermediate part consisting of two sections of sheet metal U-shape in cross section, one opening upward and the other downward, and riveted together with their respective edges turned in to form tracks, and rollers on the bars which travel in said tracks.

BENJAMIN J. BUCKINGHAM.

Witnesses:
LUCY A. FALKENBERG,
SOPHIE B. WERNER.